Patented June 4, 1940

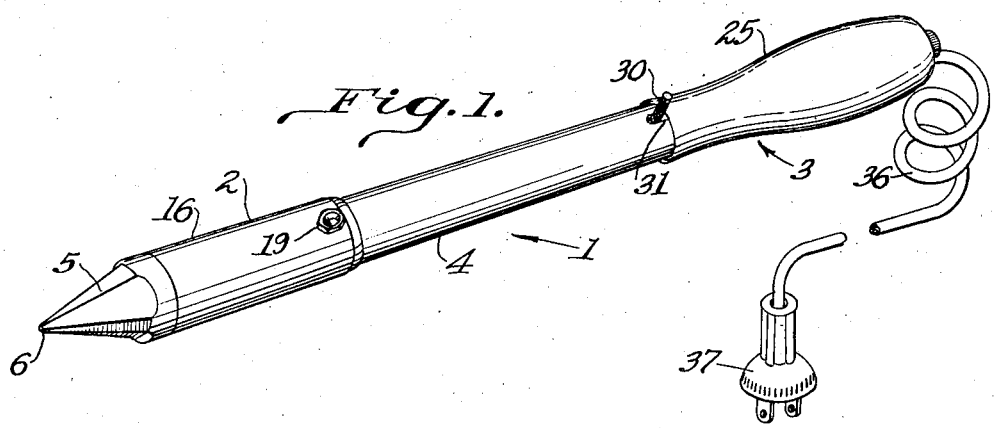
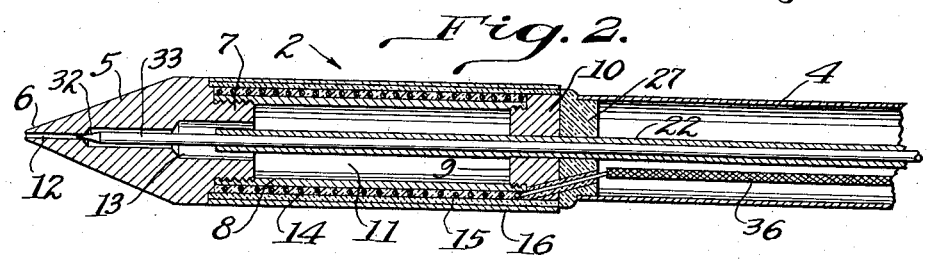
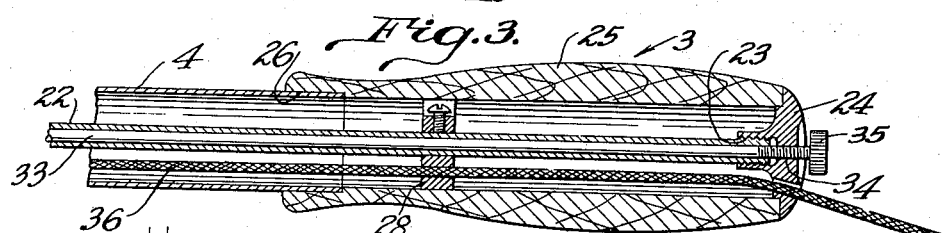
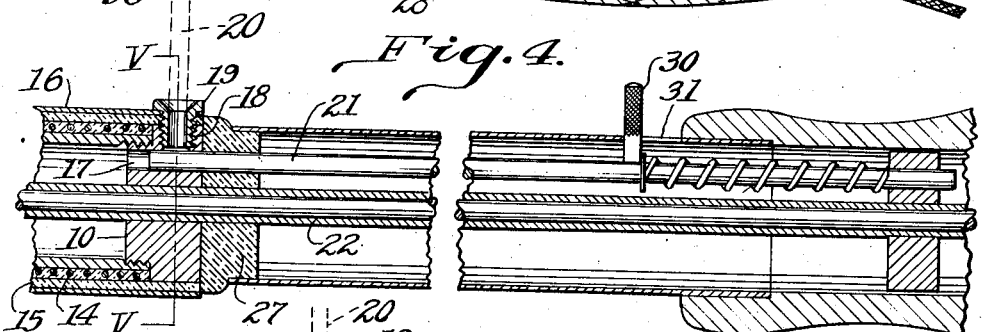
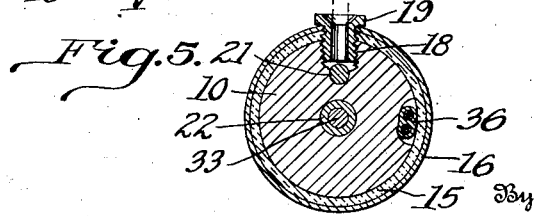

2,203,299

UNITED STATES PATENT OFFICE 2,203,299

FOUNTAIN TYPE SOLDERING IRON

Thomas H. Hallwood, Columbus, Ohio

Application January 15, 1938, Serial No. 185,200

5 Claims. (Cl. 219—27)

This invention relates to soldering irons and is particularly directed to an electrically heated, self-feeding or fountain type iron. The primary object of the present invention resides in the provision of a soldering iron having a handle portion and a body portion, the latter including a copper soldering tip in which is formed a longitudinally extending bore. This bore communicates at its inner end with a reservoir for the solder, an electrically energized heating element surrounding the reservoir and acting to heat the tip and to maintain the solder in the reservoir in molten state during use of the iron.

It is also an object of the invention to provide a port in the body of the iron through which solder is inserted or fed into the reservoir, there being a valve for closing the port between the feeding operations. This valve is provided with an operating extension conveniently located near the handle within easy reach of the user's fingers.

A further object resides in providing a valve for controlling the flow of molten solder through the bore in the tip. This valve is formed on one end of a rod which extends through the longitudinal center of the iron and is provided at the other end with a knob by means of which the valve may be adjusted toward or away from the seat in the tip to control the flow of solder.

It is a still further object of the invention to provide a sleeve to receive the valve rod, the said sleeve being secured to the rear wall of the reservoir and extending into the reservoir substantially the full length thereof to the end that when the iron is held with the tip elevated, the molten solder will be unable to flow out through the sleeve and burn the user of the iron. The sleeve extends through the handle portion of the soldering iron and is provided at the rear end with screw threads to receive a special nut which serves to hold the handle and the body in assembled relationship.

For a further understanding of the invention, attention is directed to the following description and the accompanying drawing which shows a soldering iron constructed in accordance with the invention.

In the drawing:

Fig. 1 is a perspective view of a soldering iron formed in accordance with the present invention;

Fig. 2 is a longitudinal sectional view of the body of the iron shown in Fig. 1;

Fig. 3 is a similar view of the handle portion of the iron;

Fig. 4 is a detail longitudinal sectional view showing the reservoir feeding port, the control valve for the feed port and the manual actuating member for the feed control valve;

Fig. 5 is a transverse sectional view on the plane indicated by the line V—V of Fig. 4.

Referring more particularly to the drawing, the soldering iron disclosed therein is indicated in its entirety by the numeral 1. This iron is formed to include a body portion 2 and a handle section 3, these parts being held in spaced relation by a tubular casing 4. At the forward end, the portion 2 is provided with a soldering tip 5 which is formed, as usual, from copper and tapers to a point 6 at the front end thereof. The rear end of the tip 5 is reduced as at 7 and provided with screw threads to receive an internally threaded end of a tubular member 8. The rear end of the member 8 is also internally threaded to receive a threaded boss 9 formed on a circular wall member 10, the tubular member 8, the reduced rear end of the tip and the wall member 10 combining to form a closed reservoir 11 for the retention of a body of solder. To provide for the flow of solder from the reservoir to the working extremity of the tool, the tip 5 is provided with a bore 12 extending centrally thereof from the point 6 to the rear face of the tip. The rear end of the bore 12 is enlarged as at 13 to reduce the length of the restricted portion of the bore.

Heat to melt the solder in the reservoir and raise the tip 5 to a soldering temperature is provided by an electrically energized element 14 which is coiled around and electrically insulated from the tube 8. A heat insulating sleeve 15 surrounds the element 14 and a finishing casing 16 is disposed around the latter. The insulation 15 is provided to protect the finish of the casing 16 as well as to retain the heat within the iron body and raise the temperature of the reservoir. The member 8 conducts heat from the element 14 to the tip 5 to keep the latter at a working temperature during use of the tool.

To introduce fresh solder to the reservoir, the wall member 10 is formed with a port 17 which extends from the front to the rear wall thereof. A threaded bore 18 intersects the port 17 and receives a similarly threaded hollow screw 19 through which a solder rod 20 is inserted to the port 17. The finishing casing 16 and the insulating sleeve 15 have registering openings to permit the screw 19 to be threaded into the bore 18, the screw also serving to secure these members in place on the body. A valve rod 21, slidably received by the port 17, serves to close the same to prevent the loss of solder during active use of the iron.

A second opening is formed at the center of the wall member 10 and an elongated sleeve 22 is secured therein by a welding operation. One end of the sleeve 22 projects into the reservoir 11, extending substantially the full length thereof while the other end of the sleeve extends through the handle section of the iron and is provided with screw threads 23. A nut member 24 having internal threads is positioned on the end of the sleeve, the inner end of the nut engaging the rear end of a turned wood hand grip 25. The forward end of the hand grip is provided with an enlarged bore 26 to receive the end of the tubular spacer 4, the opposite end of the spacer engaging a shoulder formed on a heat insulating washer 27 disposed adjacent the wall member 10.

Secured to the sleeve 22 within the hand grip is a collar 28 which is provided with an opening 28a in longitudinal registration with the port 17 and adapted to slidably receive the free end of the valve rod 21. Prior to the insertion of the rod in the opening 28, a coil spring 29 is positioned on the rod, this spring serving to hold the valve in a port closing position between periods of active use. An actuating pin 30, carried by the rod 21 extends outwardly through a slot 31 formed in the sleeve 4 where it may be easily engaged by the operator's fingers.

To control the flow of solder from the reservoir, a tapered valve 32 is provided in registration with the inner end of the bore in the tip 5. This valve is provided on the inner end of a rod 33 which extends longitudinally through the sleeve 22. The outer end of the rod is threaded as at 34 for cooperation with similar threads formed in the central bore of the nut member 24. The exposed end of the rod carries a knurled head 35, the rotation of which will move the rod longitudinally of the sleeve and the tapered valve toward or away from the seat formed by the shoulder at the inner end of the bore 12. If the valve engages the shoulder, flow of molten solder will be stopped. Flow will again be established by moving the valve away from the seat. By restricting the size of the bore 12, solder will only flow when the work is put in condition by the application of a flux for this purpose.

Through the provision of the sleeve in the reservoir, solder will be unable to flow around the valve rod and out of the handle when the point of the iron is elevated.

A current conducting cable 36 extends from the heating element, through the spacer 4, the hand grip 25 and out through the nut 24, the outer ends of the cables being provided with the usual plug 37 for connection with a current supply outlet.

While I have shown and described only a single embodiment of the invention, it is understood that changes in various parts and their assembly may be made and I reserve the right to all such variations as may be said to fall within the scope of the appended claims.

What is claimed is:

1. A soldering iron having a body portion and a handle portion, said body portion including a soldering tip having a central bore, a tubular sleeve secured to said tip, a wall member closing the open end of said sleeve to form a reservoir therein, the bore in said tip communicating with said reservoir, means for feeding solder to said reservoir, an electrically energized heating element surrounding said reservoir, a tube carried by said wall member and having one end projecting into said reservoir, the other end of said tube extending through said handle portion and having threads provided thereon, a nut received by the threads on said tube and serving to secure the body and handle portions of said iron in assembled relationship, and a rod with a diameter conforming substantially to the interior diameter of said tube and adjustable longitudinally therein, the inner end of said rod being tapered and engaging the edge of the bore in said tip to control the flow of molten solder from said reservoir.

2. A soldering iron having a body section and a handle section, said body section including a soldering tip provided with a reduced bore extending from the inner to the outer end thereof, a tubular body secured to the rear end of said tip, a wall member secured to the open rear end of said sleeve to form a closed reservoir, an electrically energized heating element surrounding said reservoir, said wall member being provided with a port establishing communication between the interior and the exterior of said reservoir, a valve for closing said port including a spring pressed rod extending longitudinaly of said iron, an actuating member carried by said rod adjacent said handle section, a sleeve carried by said wall member and having one end projecting into said reservoir substantially to said tip, the other end of said sleeve extending through the handle section, a threaded securing element carried by the end of said sleeve and engaging the rear end of said handle section to secure the same to said body section, a valve rod extending through said sleeve, the inner tapered end of said rod being disposed adjacent the inner end of the bore in said tip, and means for moving said valve rod longitudinally of said sleeve.

3. A soldering iron comprising a body portion having a soldering tip provided with a central bore, a tubular sleeve secured at one end to the rear portion of said tip, a wall member connected to the opposite end of said sleeve to provide a reservoir, the bore in said tip communicating therewith, means for introducing solder into said reservoir, a tube secured at its intermediate portion to said wall member, one end portion of said tube projecting into said reservoir and terminating a limited distance from said tip, a handle surrounding the other end portion of said tube, a sleeve-like shell disposed between said handle and said body portion, said shell and handle being spaced from said tube, a nut positioned on the outer end of said tube to hold said handle and shell in assembled relation to said body portion, a valve rod extending through said tube, the inner end of said rod being formed for engagement with the edge of the bore in said tip, and means provided at the outer end of said rod for imparting longitudinal movement thereto relative to said tube.

4. A soldering iron comprising a hollow body having a soldering tip at the forward end, said tip being formed with a reduced bore through which solder is fed to the work, an electrically energized heating element surrounding said body, means for introducing solder into said body, a tube secured at its intermediate portion to the rear wall of said body, one end of said tube projecting into said body and terminating a short distance from said tip, a handle surrounding the other end of said tube, a sleeve-like shell positioned between said handle and said body, said shell and handle being spaced from said tube, a member engaging the outer end of said tube and holding said handle and shell in assembled relationship with said body, a valve rod extending through said tube, the inner end of said rod being formed for engagement with the edge of the bore in said tip and means provided at the outer end of said rod for moving it longitudinally relative to said tube.

5. A soldering iron comprising a hollow body having a soldering tip at the forward end, said tip being formed with a reduced bore through which solder is fed to the work, an electrically energized heating element surrounding said body, means for introducing solder into said body, a tube secured at its intermediate portion to the rear wall of said body, one end of said tube projecting into said body and terminating a short distance from said tip, the rear wall of said body having passages for the introduction of solder into said body, a valve rod having one end movably positioned in one of said passages to control the flow of molten solder therethrough, said rod extending from the rear wall in parallel relation to said tube, a sleeve-like shell surrounding said rod and tube, a handle surrounding said rod and tube, said shell and handle being spaced from said rod and tube, a member connected with said tube for holding said shell and handle in assembled relationship to said head, an actuating member connected with said valve rod adjacent to said handle, a valve stem extending through said tube, and means disposed at the outer end of said handle for adjusting said valve stem relative to said tube to vary the spacing of the inner end from said tip.

THOMAS H. HALLWOOD.